United States Patent [19]

Smith et al.

[11] Patent Number: 4,867,951
[45] Date of Patent: Sep. 19, 1989

[54] SEPARATION OF ACTINIDES FROM LANTHANIDES

[75] Inventors: Barbara F. Smith; Gordon D. Jarvinen; Robert R. Ryan, all of Los Alamos, N. Mex.

[73] Assignee: The United States of America as represented by the United States Department of Energy, Washington, D.C.

[21] Appl. No.: 176,131

[22] Filed: Mar. 31, 1988

[51] Int. Cl.$^4$ .................. C01F 17/00; C07F 5/00; C01G 56/00; B01D 11/00

[52] U.S. Cl. .................................. 423/9; 423/10; 423/8; 423/21.5; 534/15; 534/16

[58] Field of Search .............. 423/9, 10; 252/184, 252/182.3

[56] References Cited

U.S. PATENT DOCUMENTS

| | | | |
|---|---|---|---|
| 2,899,451 | 8/1959 | Neville | 423/9 |
| 3,919,274 | 11/1975 | Crisler | 534/12 |
| 4,339,416 | 7/1982 | Fitoussi et al. | 423/10 |
| 4,461,747 | 7/1984 | Fitoussi et al. | 423/10 |
| 4,496,523 | 1/1985 | Bonnin et al. | 423/9 |
| 4,572,802 | 2/1986 | Hubert et al. | 534/12 |

Primary Examiner—Brooks H. Hunt
Assistant Examiner—Virginia B. Caress
Attorney, Agent, or Firm—Richard J. Cordovano; Paul D. Gaetjens; Judson R. Hightower

[57] ABSTRACT

An organic extracting solution and an extraction method useful for separating elements of the actinide series of the periodic table from elements of the lanthanide series, where both are in trivalent form. The extracting solution consists of a primary ligand and a secondary ligand, preferably in an organic solvent. The primary ligand is a substituted monothio-1,3-dicarbonyl, which includes a substituted 4-acyl-2-pyrazolin-5-thione, such as 4-benzoyl-2,4-dihydro-5-methyl-2-phenyl-3H-pyrazol-3-thione (BMPPT). The secondary ligand is a substituted phosphine oxide, such as trioctylphosphine oxide (TOPO).

2 Claims, 6 Drawing Sheets

Substituted monothio - 1,3 - dicarbonyl

TTTA

TDBM

BMPPT

TBMPP

*Fig.1*

PHOSPHINE OXIDE

DHPOP

DHDECMP

DBOPCMPO

TPDPM

SEPARATION OF ACTINIDES FROM LANTHANIDES

This invention relates to the field of solvent extraction. This invention is the result of a contract with the Department of Energy (Contract No. W-7405-ENG-36).

BACKGROUND OF THE INVENTION

Effluent streams containing elements of the actinide series and the lanthanide series of the periodic table are generated in certain nuclear energy applications, such as the processing of waste from a light water nuclear reactor. The actinides and lanthanides are usually in a trivalent state and in an acidic aqueous solution. It is desirable to separate the two classes of elements for a variety of reasons. For example, the half-lives of lanthanides are much shorter than those of actinides; therefore, the quantity of waste which must be stored for a very long time can be reduced by removing lanthanides from the waste. Also, actinides may be used in applications which require a radioactive source. Further, it is necessary to characterize radioactive effluent streams and separation of actinides from lanthanides is a first step in quantitative analysis of an effluent stream.

The separation of trivalent actinides from trivalent lanthanides is one of the more difficult problems in separation science. These elements posses few of the differences in physical and chemical characteristics necessary to effect separation of the groups from each other. For example, the separation is difficult because trivalent lanthanide atoms and trivalent actinide atoms have similar chemical properties, their ionic radii are similar in size, and complexes of these elements exhibit a strong ionic character.

Michelle Bonnin et al., "Process for Separating the Actinides and Lanthanides Present in the Trivalent State in an Acid Aqueous Solution," U.S. Pat. No. 4,496,523, Jan. 29, 1985, teaches separation of actinides from lanthanides by extraction using an organic solvent comprising a first extracting agent formed by an organic bonding agent having an electron-donor nitrogen atom and a second extracting agent formed by an acid organosoluble organic compound able to exchange its hydrogen ions for metal ions or by a metallic salt of such a compound.

Richard Fitoussi et al., "Method for Separating Actinides from Lanthanides in an Acidic Aqueous Solution," U.S. Pat. No. 4,461,747, July 24, 1984, teaches the separation using an organic solvent comprising a system of extractants constituted by an acidic organophosphorated compound containing at least one electron-donor sulfur atom, such as di-2-ethylhexyl-dithio-phosphoric acid, and by a neutral organophosphorated compound containing at least one electron-donor oxygen atom, such as trioctylphosphine oxide.

Herve Hubert et al., "Process for Recovering Actinides and/or Lanthanides," U.S. Pat. No. 4,572,802, Feb. 25, 1986, teaches a process for recovering both lanthanides and actinides from an aqueous acid solution, but which does not separate actinides from lanthanides.

SUMMARY OF THE INVENTION

This invention is an organic extracting solution and an extraction method useful for separating elements of the actinide series of the periodic table from elements of the lanthanide series, where both are in trivalent form. The extracting solution consists of a primary ligand and a secondary ligand, preferably in an organic solvent. The primary ligand is a substitued monothio-1,3-dicarbonyl, which includes a substituted 4-acyl-2-pyrazolin-5-thione, such as 4-benzoyl-2,4-dihydro-5-methyl-2-phenyl-3H-pyrazol-3-thione (BMPPT). The secondary ligand is a substituted phosphine oxide, such as trioctylphosphine oxide.

In a broad embodiment, the primary ligand is a substituted monothio-1,3-dicarbonyl having substituents chosen from a class consisting of alkyl groups, alkoxy groups, aryl groups, aroxy groups, and alkylamine groups, where said substituted monothio-1,3-dicarbonyl is an acyclic compound or a cyclic compound with an acyl group attached to the ring in a position adjacent to the ring thiocarbonyl or a cyclic compound with a thioacyl group attached to the ring in a position adjacent to the ring carbonyl; and a secondary ligand which is a substituted phosphine oxide having substituents chosen from a class consisting of alkyl groups, alkoxy groups, aryl groups, aroxy groups, 2-pyridyl-N-oxide groups, carbamoylmethylene groups having either one or two alkyl or aryl groups substituted at the nitrogen atom, and phosphorylmethylene groups having two alkyl or aryl groups substituted at the phosphorous atom.

In another embodiment, the primary ligand is chosen from a class consisting of substituted 4-acyl-2-pyrazolin-5-thiones and substituted 4-thioacyl-2-pyrazolin-5-ones, where substituents are chosen from a class consisting of alkyl groups, alkoxy groups, aryl groups, aroxy groups, and alkylamine groups.

BRIEF DESCRIPTION OF THE DRAWINGS

The accompanying drawings, which are a part of the specification, show chemical compounds of the invention and present, in the form of graphs, results of the practice of the invention.

DETAILED DESCRIPTION OF THE INVENTION

Figure 3:
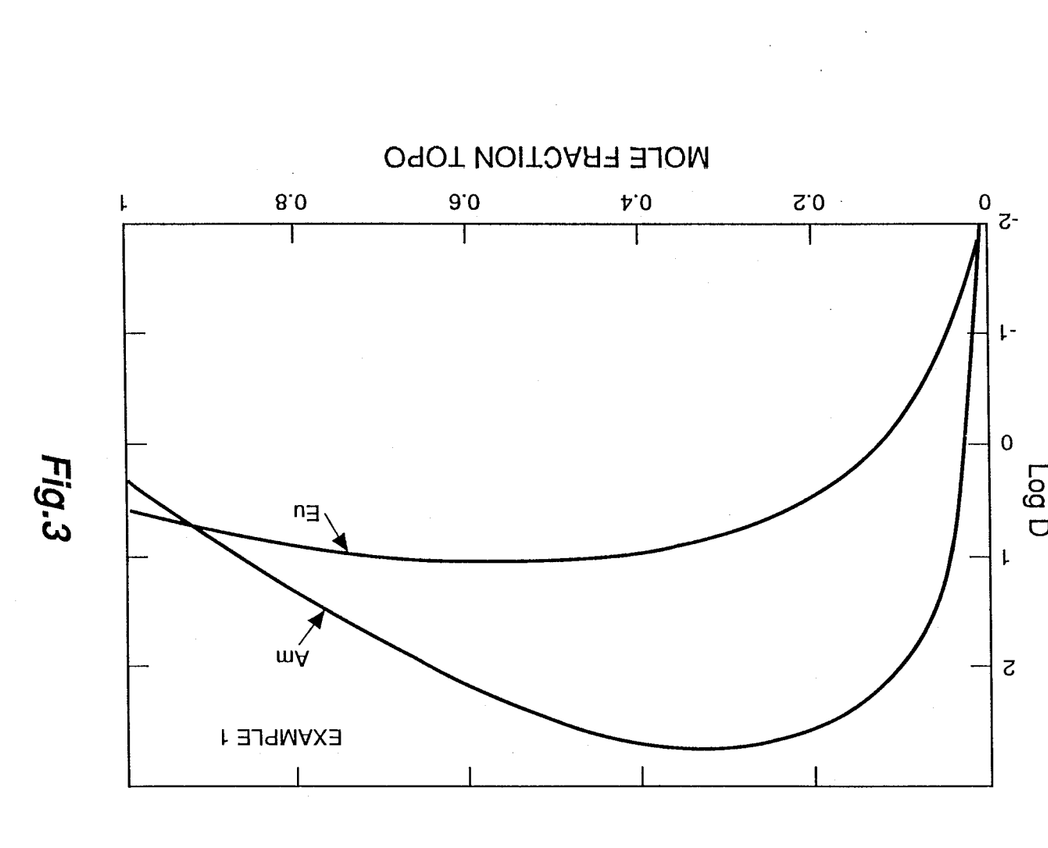
FIGS. 3, 4, 5, and 6 present results of experimentation described in the Examples presented herein.

The extracting solutions of this invention are comprised of two extracting agents which together form a synergistic system which will selectively coordinate with actinides over lanthanides. A primary ligand alone, such as BMPPT, exhibits no measurable extracting ability. The ability of a secondary ligand alone to extract actinides is small, as can be seen in FIG. 3, where the americium curve intersects the axis at the right of the plot, representing pure TOPO. It may be advantageous to use an extracting solution having two or more primary ligands and/or two or more secondary ligands.

Most of the experimentation of this invention was done using americium, a representative actinide, and europium, a representative lanthanide, since their behavior and properties are typical of their groups. Other elements extracted by means of the inventive extracting solution were the lanthanides, cerium, promethium, gadolinium, thulium, and lutetium, and the actinides, thorium and uranium.

A primary ligand of this invention is a substituted monothio-1,3-dicarbonyl which is acyclic or which is in the form of a cyclic compound with an acyl group or a thioacyl group attached to the ring. Referring to the compound labelled as a substituted monothio-1,3-dicarbonyl in FIG. 1, either of the dashed lines connecting the two R groups represents the bond which would close the ring to form the cyclic compound (a cyclic monothio-1,3-dicarbonyl has only one ring). The compound as shown without the dashed lines may be referred to as an acyclic compound. Substituted 4-acyl-2-pyrazolin-5-thiones and substituted 4-thioacyl-2-pyrazolin-5-ones are members of the family of monothio-1,3-dicarbonyls.

Figure 1:
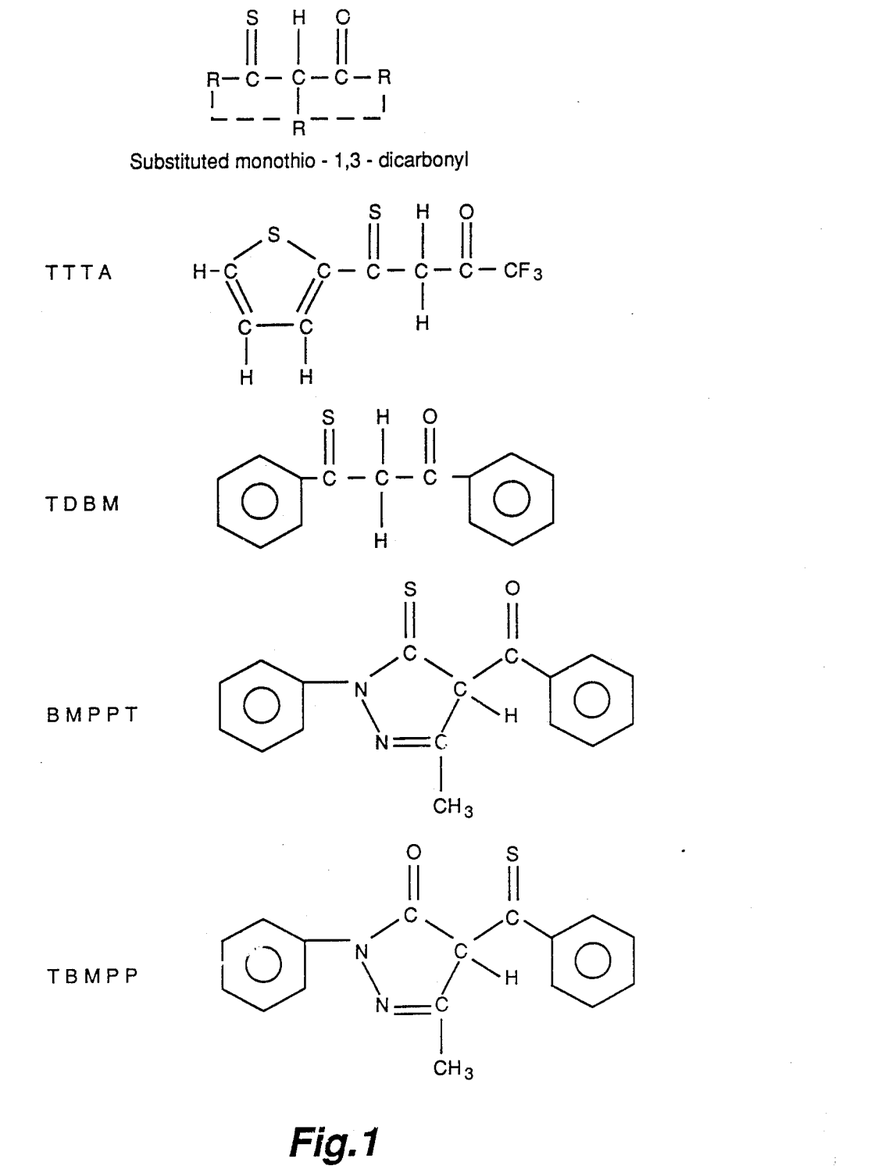
FIG. 1 depicts the structural arrangements of several primary ligands.

Primary ligands used in the experimentation were 4-benzoyl-2,4-dihydro-5-methyl-2-phenyl-3 H-pyrazol-3-thione (BMPPT) and 4-thiobenzoyl-2,4-dihydro-5-methyl-2-phenyl-3H-pyrazol-3-one (TBMPP). BMPPT is 4-acyl-2-pyrazolin-5-thione with two phenyl groups and a methyl group substituted for three hydrogens; other substituents, such as alkyl groups, alkoxy groups, acyl groups, aryl groups, aroxy groups, and alkylamine groups may be substituted for hydrogen atoms of 4-acyl-2-pyrazolin-5-thione to form compounds usable as primary ligands. TBMPP is 4-thioacyl-2-pyrazolin-5-one with two phenyl groups and a methyl group substituted; other substituents, such as those mentioned immediately above, may be substituted for hydrogen atoms of 4-thioacyl-2-pyrazolin-5-one to form primary ligands. Other compounds which are expected to function well as primary ligands and which will be tested soon include thiothenoyltrifluoromethylacetone (TTTA), 4-hexanoyl-2,4-dihydro-5-methyl-2-phenyl-3H-pyrazol-3-thione and monothiodibenzoylmethane (TDBM). FIG. 1 depicts structural formulas of these primary ligands.

A secondary ligand of this invention may be described as a neutral organo-phosphorylated compound containing at least, but not limited to, one electron-donor oxygen atom. More specifically, the secondary ligands are substituted phosphine oxides.

It may be helpful to identify the structural formulas of the more complex substituents of the secondary ligands. A 2-pyridyl-N-oxide group may be seen in FIG. 2; it is the ring compound attached to the phosphorus in DHPOP. A carbamoylmethylene group may be seen in FIG. 2; it is the portion of DHDECMP which consists of a carbon with an oxygen atom double bonded to it and a substituted nitrogen atom bonded to it. A phosphorylmethylene group may be seen in FIG. 2; it is the phosphorous atom of TPDPM having 4 groups attached to it, a double bonded oxygen, a methylene group ($CH_2$), and two other groups, such as the phenyl groups which are shown.

Figure 2:
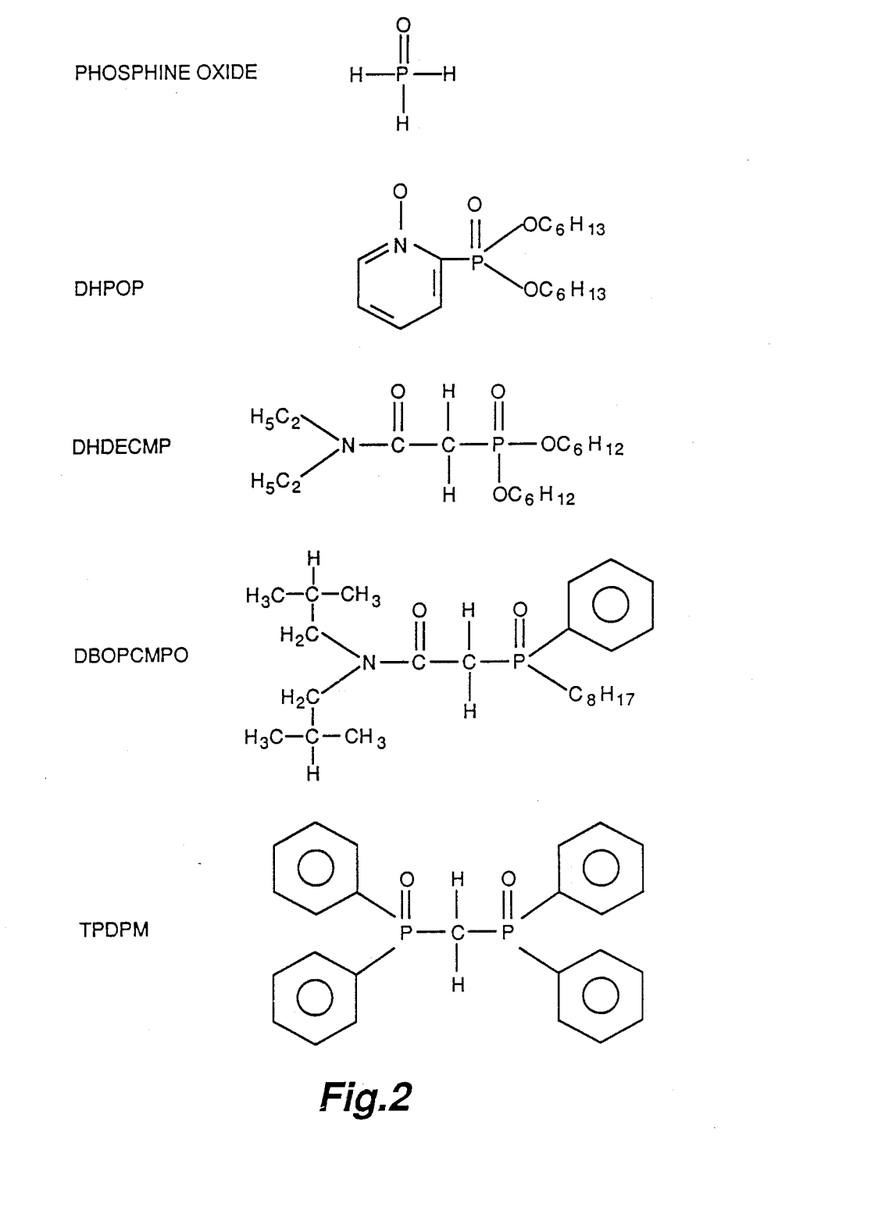
FIG. 2 depicts the structural arrangements of phosphine oxide and of several secondary ligands.

Secondary ligands used in the experimentation were trioctylphosphine oxide (TOPO), dihexyl-(2-pyridyl-N-oxide) phosphonate (DHPOP), N,N-dihexyl-diethyl-carbamoylmethylene phosphonate (DHDECMP), and N,N-diisobutyloctylphenyl carbamoylmethylenephosphine oxide (DBOPCMPO). Tetraphenyl diphosphoryl methane (TPDPM) will be tested soon as a secondary ligand. FIG. 2 depicts structural formulas of these secondary ligands.

Preferably, the ligands are diluted in an inert solvent such as toluene, benzene, other alkyl benzenes, or alkane solvents (but not chloroform).

A method of preparing BMPPT may be found in G. D. Jarvinen et al., "Preparation and Crystal and Molecular Structures of Uranyl Complexes of 4-Benzoyl-2,4-dihydro-5-methyl-2-phenyl-3H-pyrazol-3-thione and the Pyrazol-3-one Analogue." Inorganica Chemica Acta 129, 139–148 (1987). TOPO was purchased from Eastman Chemicals. Other compounds mentioned herein may be prepared by methods readily available in the literature to those skilled in the art.

In the examples presented below, europium was present in the aqueous solution in a concentration of $10^{-8}$ moles per liter of solution and americium was present in the aqueous solution at the same concentration. The elements were purchased from New England Nuclear. Mixtures of the extracting solution and the aqueous solution were agitated for about 15 to 30 minutes and then placed in a centrifuge. After centrifugation, the resulting organic and aqueous phases were separated by decantation. All experimentation was done in Teflon ® vessels at room temperature and atmospheric pressure. All concentrations were determined by means of gamma spectrometry. The distribution coefficient, D, for an element is the number obtained by dividing the concentration of the element in the extracting solution by the concentration of the element in the aqueous solution, the concentrations being measured after the solutions are contacted with one another and separated.

EXAMPLE 1

FIG. 3 shows the results of a series of extractions using extracting solutions of BMPPT and TOPO in toluene. The log of the distribution coefficient for americium (Am) and the log of the distribution coefficient for europium (Eu) is plotted against the mole fraction of TOPO in the extracting solution before doing the extraction. The total concentration of the two ligands in each of the extracting solutions was 0.25 moles per liter of extracting solution, with the concentration of each ligand being varied as shown in FIG. 3. Before extraction, each of the aqueous solutions used contained lithium perchlorate in a concentration of $10^{-1}$ moles per liter of solution and sulfanilic acid, which was a buffer, in a concentration of $10^{-2}$ moles per liter of solution. Perchloric acid was added to each aqueous solution to obtain a pH of 3. The best results were obtained when the molar ratio consisting of the concentration of BMPPT in the extracting solution divided by the concentration of TOPO in the extracting solution was about 4.8, but good results were obtained when the molar ratio between BMPPT and TOPO was in the range of about 2 to about 24.

EXAMPLE 2

Figure 4:
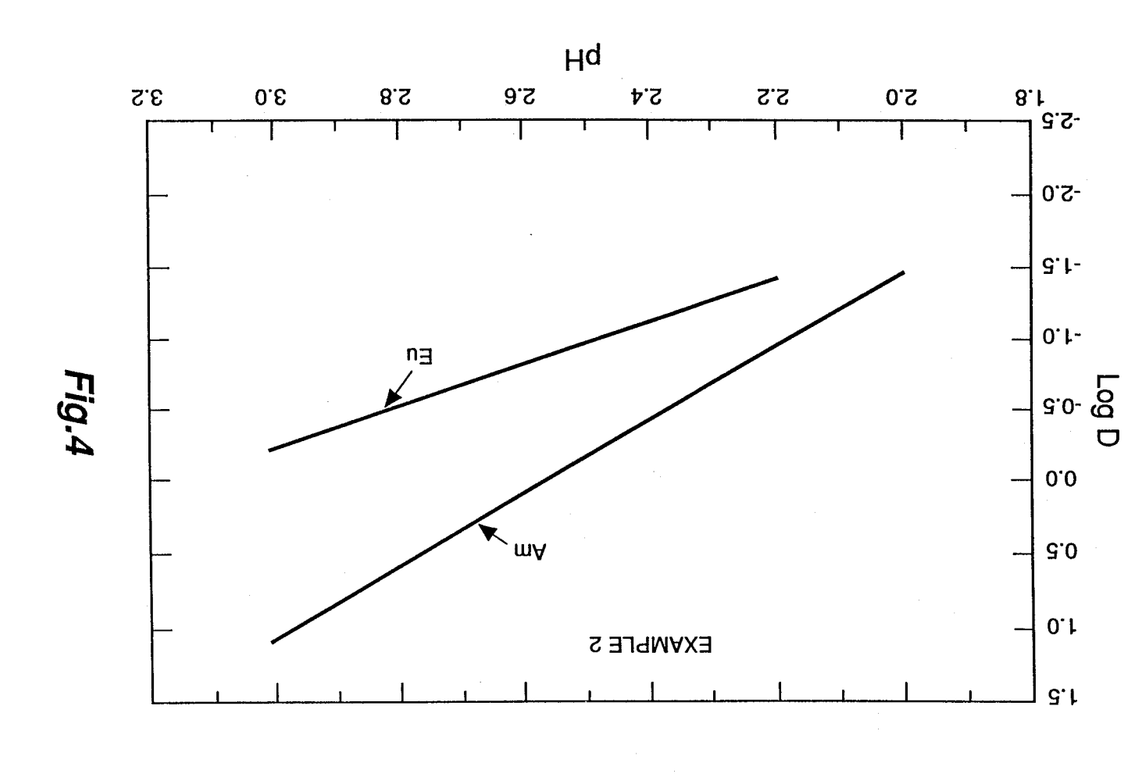

FIG. 4 presents the results of a series of experiments in which the pH of the aqueous solution was varied while other parameters were held constant. Each extracting solution was $10^{-1}$ molar in BMPPT and $5 \times 10^{-2}$ molar in TOPO with benzene as the solvent. Each aqueous solution was $10^{-1}$ molar in lithium perchlorate and perchloric acid was added to vary the pH. The log of the distribution coefficient for americium is plotted against the pH of the aqueous solution, as is the log of the distribution coefficient for europium.

EXAMPLE 3

The pH variation was studied in the same manner as in Example 2. Each extracting solution was $2.5 \times 10^{-1}$ molar in BMPPT and $10^{-2}$ molar in TOPO with toluene as the solvent. The aqueous solutions were $10^{-1}$ molar in sodium nitrate and nitric acid was added to vary the pH. The results may be seen in FIG. 5.

EXAMPLE 4

Figure 5:
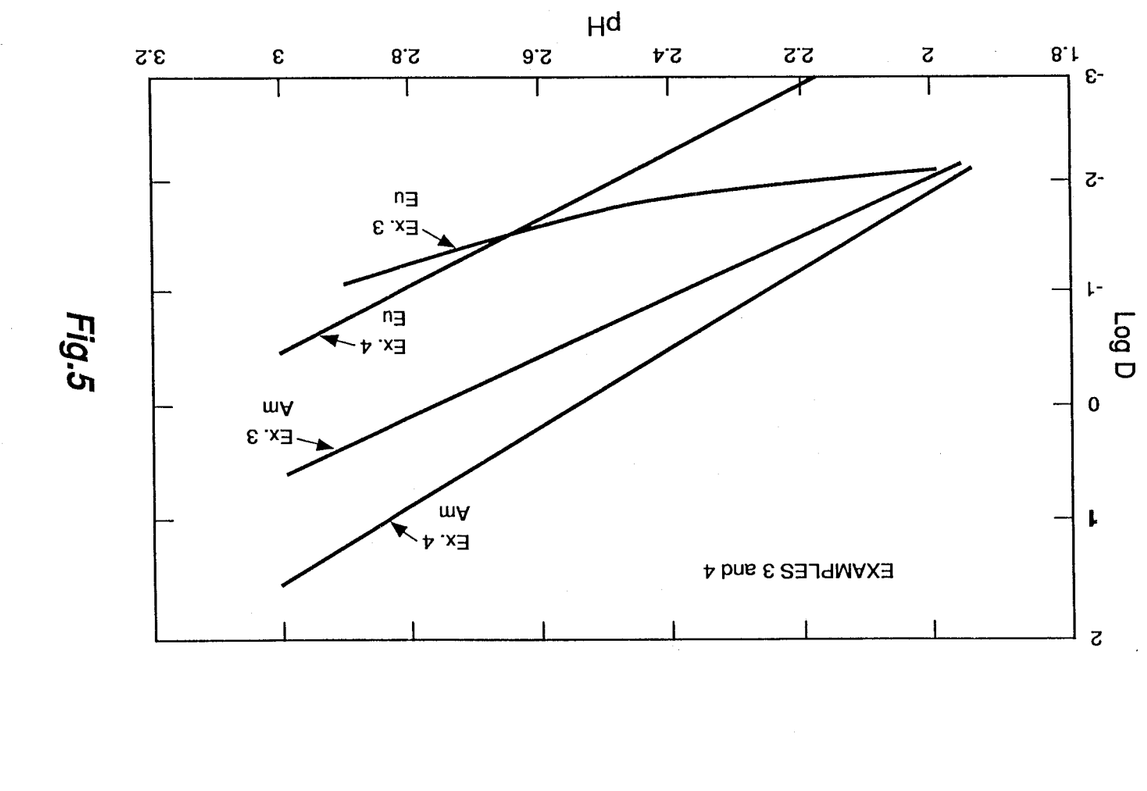

The pH variation was studied in the same manner as in Example 2 and the results are presented in FIG. 5. Each extracting solution was toluene, which was $2.5 \times 10^{-1}$ molar in BMPPT and $10^{-2}$ molar in TOPO. The aqueous solutions were $10^{-1}$ molar in sodium chloride and hydrogen chloride was used to vary the pH.

EXAMPLE 5

Figure 6:
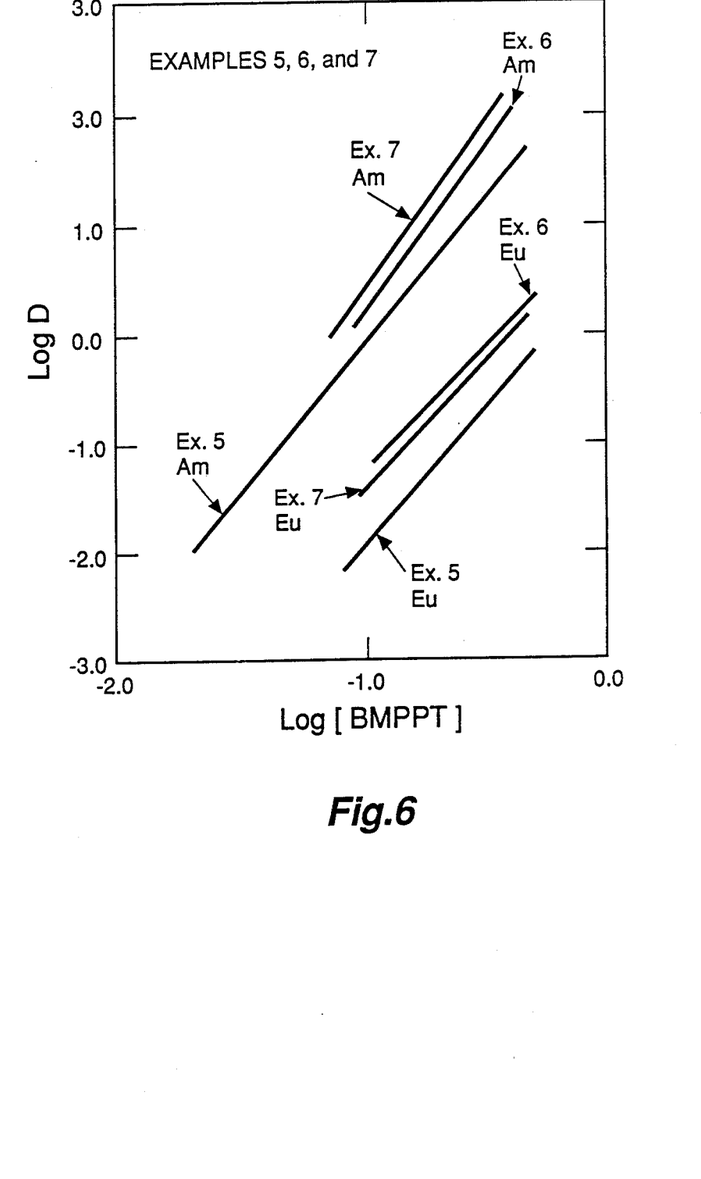

The results of this experiment are shown in FIG. 6. In benzene extracting solutions, the concentration of BMPPT was varied from $1.6 \times 10^{-2}$ molar to $3 \times 10^{-1}$ molar, while the concentration of TOPO was maintained at $5 \times 10^{-2}$ molar. The aqueous solutions were $10^{-1}$ molar in lithium perchlorate and perchloric acid was added to obtain a pH of 3. The log of each distribution coefficient is plotted against the log of the concentration of BMPPT in the extracting solution before extraction.

EXAMPLE 6

The results of this experiment, which was conducted in the same manner as that of Example 5, are shown in FIG. 6. For the extracting solution, the concentration of BMPPT in toluene was varied from $6 \times 10^{-2}$ molar to $3 \times 10^{-1}$ molar, while the concentration of TOPO was maintained at $10^{-2}$ molar. The aqueous solution was $10^{-1}$ molar in sodium nitrate and nitric acid was added to obtain a pH of 3.

EXAMPLE 7

The results of this experiment, which was conducted in the same manner as that of Example 5, are shown in FIG. 5. For the extracting solution, the concentration of BMPPT in benzene was varied from $6 \times 10^{-2}$ molar to $3 \times 10^{-1}$ molar, while the concentration of TOPO was maintained at $10^{-2}$ molar. The aqueous solution was $10^{-1}$ molar in sodium chloride and hydrochloric acid was added to obtain a pH of 3.

As used herein, a mixture means a composition of two or more substances which are not chemically bound to one another and may not be physically homogeneous.

The compounds 1,10-phenanthroline and substituted 1,10-phenanthrolines, such as 4,7-diphenyl-1,10-phenanthroline, may be used as secondary ligands. The substituents of a 1,10phenanthroline molecule may vary in number from 1 to 8 and are chosen from a class consisting of phenyl groups, substituted phenyl groups and acyl groups.

As used herein, an aryl group is a univalent radical derived from an aromatic compound which is a five or six member ring compound or fused ring compound. An aroxy group is an aryl group attached to an oxygen atom having a free valence. An alkoxy group is an alkyl group attached to an oxygen atom having a free valence. An alkylamine group is a nitrogen atom having one free valence, an alkyl group attached to it, and another substituent attached to it which may be hydrogen, an alkyl group, or an aryl group. An acyl group is a carbon atom having one free valence, an oxygen atom double bonded to it, and a hydrogen, alkyl, or aryl group attached to it.

The above-defined terms, such as alkyl and aryl, are to be understood to include groups having substituents in place of hydrogen atoms; for example, the term aryl group includes an aryl group having an alkyl group replacing one of its hydrogen atoms.

The above discussion and the examples presented herein have described a single contacting of the extracting solution and the aqueous solution. An extracting solution of this invention may also be used in a multiple stage extraction system, where a plurality of contacting and separating steps take place. For example, a countercurrent extraction column having internal trays is familiar to those skilled in the art. A stream of the extracting solution and a stream of the aqueous solution are supplied to a countercurrent extraction column at different locations and two product streams are withdrawn, an actinide-rich organic phase and a lanthanide-rich aqueous phase. Though contacting steps and stages are referred to, a multistage extraction system need not have physically separate stages.

The foregoing description of the invention has been presented for purposes of description. It is not intended to be exhaustive or to limit the invention to the precise form discussed above, since many modifications and variations are possible in light of the above teaching. The examples were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of separating actinides from lanthanides, where said actinides and lanthanides are in a trivalent state in an acidic aqueous solution, said method comprising contacting said aqueous solution with an organic extracting solution to form a mixture and separating said mixture into an actinide-rich organic phase and a lanthanide-rich aqueous phase, where said organic extracting solution is comprised of:

a. a primary ligand which is a substituted monothio-1,3-dicarbonyl having substituents chosen from a class consisting of alkyl groups, alkoxy groups, aryl groups, aroxy groups, and alkylamine groups, where said substituted monothio-1,3-dicarbonyl is an acyclic compound or a cyclic compound with an acyl group attached to the ring at a ring position adjacent to a ring thiocarbonyl or a cyclic compound with a thioacyl group attached to the ring at a ring position adjacent to a ring carbonyl; and    b. a secondary ligand which is a substituted phosphine oxide having substituents chosen from a class consisting of alkyl groups, alkoxy groups, aryl groups, aroxy groups, 2-pyridyl-N-oxide groups, carbamoylmethylene groups having either one or two alkyl or aryl groups substituted at the nitrogen atom, and phosphorylmethylene groups having two alkyl or aryl groups substituted at the phosphorous atom.

2. A method of separating actinides from lanthanides, where said actinides and lanthanides are in a trivalent state in an acidic aqueous solution, said method comprising supplying said aqueous solution and an organic extracting solution to a multiple stage extraction apparatus for processing by means of a plurality of contacting and separating steps to produce an actinide-rich organic phase and a lanthanide-rich aqueous phase, where said organic extracting solution is comprised of:

a. a primary ligand which is a substituted monothio-1,3-dicarbonyl having substituents chosen from a class consisting of alkyl groups, alkoxy groups, aryl groups, aroxy groups, and alkylamine groups, where said substituted monothio-1,3-dicarbonyl is an acyclic compound or a cyclic compound with an acyl group attached to the ring at a ring position adjacent to a ring thiocarbonyl or a cyclic compound with a thioacyl group attached to the ring at a ring position adjacent to a ring carbonyl; and b. a secondary ligand which is a substituted phosphine oxide having substituents chosen from a class consisting of alkyl groups, alkoxy groups, aryl groups, aroxy groups, 2-pyridyl-N-oxide groups, carbamoylmethylene groups having either one or two alkyl or aryl groups substituted at the nitrogen atom, and phosphorylmethylene groups having two alkyl or aryl groups substituted at the phosphorous atom.

* * * * *